United States Patent [19]

Chohan et al.

[11] Patent Number: 4,802,696
[45] Date of Patent: Feb. 7, 1989

[54] QUICK CONNECT COUPLING

[75] Inventors: Satish M. Chohan; Jerry J. Antosch, both of Rockford, Ill.

[73] Assignee: The Gates Rubber Company, Denver, Colo.

[21] Appl. No.: 922,482

[22] Filed: Oct. 23, 1986

[51] Int. Cl.[4] .................................... F16L 37/08
[52] U.S. Cl. ................... 285/317; 285/319; 285/340; 285/375; 285/921
[58] Field of Search ............ 285/340, 921, 351, 321, 285/375, 267, 323, 319, 317

[56] References Cited

U.S. PATENT DOCUMENTS

| | | | |
|---|---|---|---|
| 921,691 | 5/1909 | Friday | 285/921 X |
| 1,201,116 | 10/1916 | Vaughn | 285/375 X |
| 2,950,132 | 8/1960 | Kocsuta | 285/340 X |
| 3,429,596 | 2/1969 | Marshall | 285/340 |
| 3,653,695 | 4/1972 | Dunton et al. | 285/340 |
| 3,744,824 | 7/1973 | Roos | 285/317 |
| 4,062,574 | 12/1977 | Scholin | 285/340 |
| 4,068,866 | 1/1978 | Saha | 285/375 X |
| 4,142,739 | 3/1979 | Billingsley | 285/323 |
| 4,258,943 | 3/1981 | Vogt et al. | 285/340 |
| 4,298,220 | 11/1981 | Kukuminato | 285/317 X |
| 4,423,892 | 1/1984 | Bartholomew | 285/921 X |
| 4,541,658 | 9/1985 | Bartholomew | 285/921 X |
| 4,586,734 | 5/1986 | Grenier | 285/340 |
| 4,601,497 | 7/1986 | Bartholomew | 285/319 |
| 4,613,172 | 9/1986 | Schattmaier | 285/340 |
| 4,637,640 | 1/1987 | Fournier et al. | 285/319 |
| 4,681,351 | 7/1987 | Bartholomew | 285/319 |

FOREIGN PATENT DOCUMENTS 281086 9/1970 U.S.S.R. .......................... 285/319
2166509 5/1986 United Kingdom .

Primary Examiner—Thomas F. Callaghan
Attorney, Agent, or Firm—H. W. Oberg, Jr.; C. H. Castelman, Jr.

[57] ABSTRACT

A quick connect female coupling with a brasing means in a bore of the coupling that bias an O-ring type packing in sealing engagement against part of the coupling and a pipe end portion when the coupling is in use. A retaining ring in the coupling snap fits against an external collar of a pipe end portion as a retaining means when the coupling is in use.

14 Claims, 2 Drawing Sheets 4,802,696

QUICK CONNECT COUPLING

BACKGROUND OF THE INVENTION

The invention relates to pipe joints or couplings, but more particularly the invention relates to a snap fit connecting coupling with an O-ring type packing.

Quick connect couplings are supplanting other types of fluid couplings such as flared, beaded, and tapered fittings coupled together with a swivel type nut; or hoses that are coupled to a pipe end portion with an external hose clamp. Quick connect couplings are being used in many applications, such as automotive applications, because of a mimimum amount of time they require to make a connection and effect a fluid seal. Such couplings may have an O-ring type packing disposed in the bore of a housing as a means for effecting a seal between the housing and a male end pipe portion; a snap fit connection may be used for quickly connecting the housing to a male end pipe portion. Examples of quick connecting couplings using at least one O-ring between a male end pipe portion and a housing member appear in U.S. Pat. Nos. 4,423,892; 4,541,658; U.K. patent application No. 2,166,509; and European patent application No. 168,223. In such couplings, the O-rings effect a fluid pressure augmented seal along (1) a circumferential length at the O.D. of a male end pipe portion and (2) along a circumferential length at an I.D. portion of a housing (i.e., along I.D. and O.D. portions of the O-ring, respectively). In some applications, redundant O-rings with back-up rings are used because the fluid pressure activated seals are required to effect sealing along the cumulative length at the O.D. of a pipe end portion and the O.D. of a housing portion; redundant O-rings have proven effective when there is relative motion between a coupling housing and an attached pipe end portion. Some couplings such as disclosed in the U.S. Pat. No. 4,541,658 require elaborately shaped, snap fit retaining means for interfitting with a coupling housing and a male end pipe portion being retained.

SUMMARY OF THE INVENTION

In accordance with the invention, a female coupling of the quick connect type is provided for use with the male end pipe portion having an external collar. A biasing means located in a bore of the coupling housing, biases an O-ring type packing in sealing engagement against the housing and a pipe end portion when the coupling is in use. A retaining ring located in the bore of the housing has a plurality of deflectable fingers that snap fit against an external collar of a pipe end portion as a retaining means when the coupling is in use.

One object of the invention is to minimize the cumulative length of a seal that must be affected (i.e., the cumulative length along the I.D. and O.D. of an O-ring type packing).

Another object of the invention is to effect a fluid tight seal while compensating for O-ring distortion and aging.

Another included object of the invention is to simplify the snap fit connecting means for retaining a pipe end portion which has an external collar.

These and other objects or advantages of the invention will be apparent after reviewing the drawings and description thereof wherein.

DESCRIPTION OF PREFERRED EMBODIMENT

Figure 1:
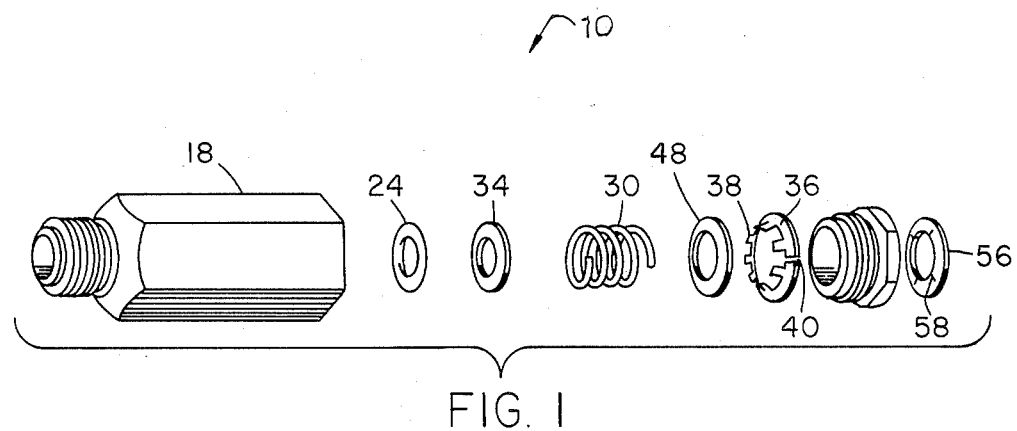
FIG. 1 is an exploded isometric view showing component parts associated with one embodiment of a quick connect coupling of the invention.

Referring to the FIGS., a female coupling 10 is provided which is of the type for quickly connecting to a male end pipe portion 12 which has an external collar 14 and a bull-nosed type end 16. The coupling has a housing 18 in which there are at least two essential and substantially coaxial bores adapted for receiving a male end pipe portion. A first bore 20 is sized slightly larger than the pipe end portion to be received and a second bore 22, larger than the first bore 20, is sized to receive an O-ring 24 that is oriented coaxially with the bores. The difference in bore diameters define an intermediate, generally radially extending annular shoulder 26 against which a side portion 28 of the O-ring is located. A biasing means, such as in the form of a coiled compression spring 30, is located in and oriented substantially coaxially with the larger diameter bore, has a first end 32 juxtaposed a side portion of the O-ring that oppositely faces the annular shoulder 26. Optionally, but preferably, a back-up ring 34 is interpositioned between the O-ring and the end 32 of the spring. The spring passes the O-ring in sealing engagement against the shoulder 26 which is later explained.

A means for retaining a part of a pipe end portion is disposed in the housing and is in the form of a retaining ring 36 which has a plurality of deflectable fingers 38 that extend radially inwardly into at least part of the larger diameter bore 22. The retaining ring 36 may optionally be split 40 so that the ring may be deformed and removed from behind the collar of a pipe end portion. The retaining ring 36 is trapped or secured in a bore 42 of the housing by a fastening means such as in the form of a threaded fastener 44 which has a bore 46 oriented substantially coaxially with the bores of the housing. The bore 46 is larger in diameter than the external collar 14 and the deflectable fingers 38 are deflectable in the direction toward the O-ring, to at least the diameter of the external collar 14. Optionally, but preferably, a washer 48 is interpositioned between the deflectable fingers 38 and second end 50 of the spring. The washer is disposed in a coaxial bore 52 of the housing which has a diameter that is greater than that of the external collar 14.

Figure 2:
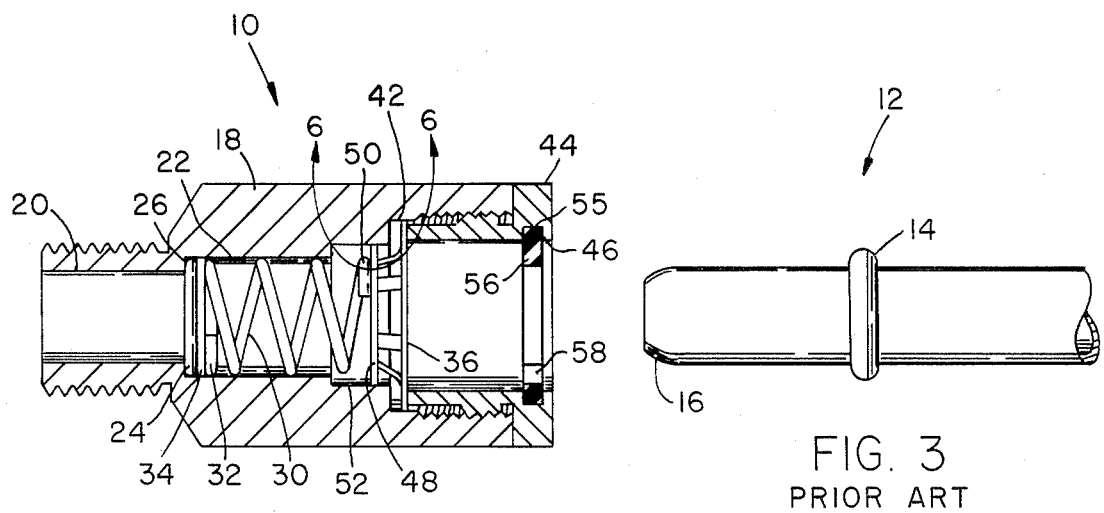
FIG. 2 is a front view in partial axial section showing the assembled component parts of FIG. 1.
Figure 3:
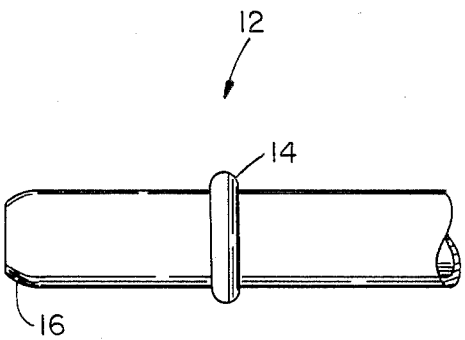
FIG. 3 is a front view of a prior art male end pipe portion of the type with an external collar.
Figure 6:
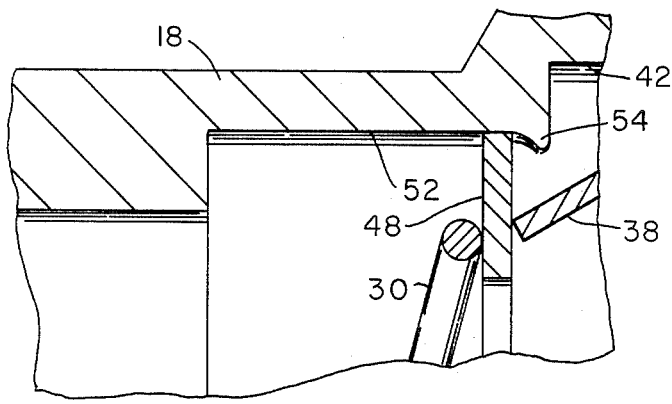
FIG. 6 is a view taken along the line 6—6 of FIG. 2 showing an optional deformation of a portion of the coupling.

The fastening means may also be used to secure the spring in its location in the housing as illustrated by FIG. 2, or alternately, a portion of the housing may be deformed 54 such as by staking, juxtaposed the washer 48 as illustrated in FIG. 6. Optionally, a fastening means may include a groove 55 for retaining a polymeric washer 56 with radial splits that define a plurality of radially inwardly extending deflectable fingers 58. The polymeric washer is oriented coaxially with the bore of the fastening means and the deflectable fingers define a means for inhibiting foreing material entering the housing when the coupling is in use with a pipe end portion.

Figure 4:
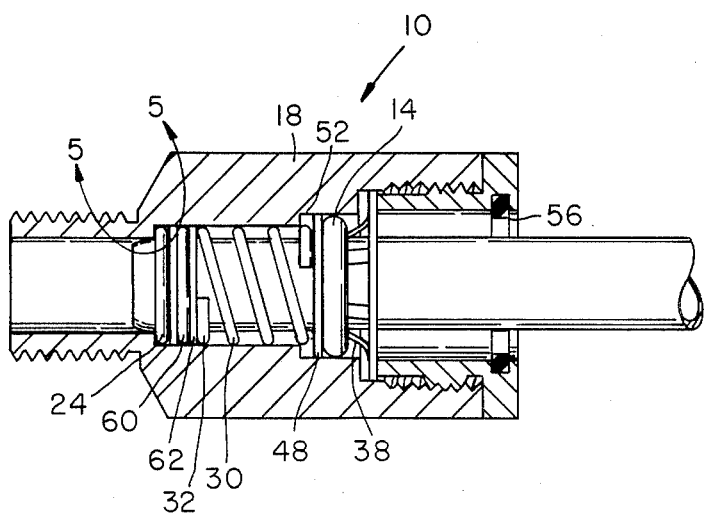
FIG. 4 is a view similar to FIGS. 2 and 3 but showing the coupling of the invention attached to the male end pipe portion, and FIG. 4 also shown another embodiment of the invention utilizing two O-rings.

In use, the coupling and a pipe end portion are pushed together so that the external collar firstly, deflects the polymeric fingers; secondly, deflects the retaining ring finger and thirdly, passes to a position beyond the retaining ring deflectable fingers as illustrated in FIG. 4. The helical spring is further compressed as the external collar is pushed against the washer 48. The deflectable fingers of the retaining ring snap fit in toggle fashion behind the collar of the pipe end portion to retain and lock it in position in the coupling. FIG. 4 also illustrates the use of a second and optional O-ring 60 that is supported by a second back-up ring 62.

Figure 5:
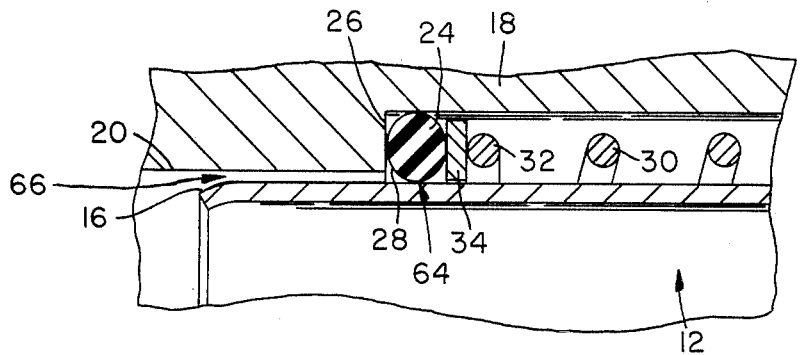
FIG. 5 is an enlarged partial view taken along the line 5—5 of FIG. 4 but showing the use of only one O-ring as in the coupling of FIG. 2.

While the second O-ring offers sealing redundancy, primary sealing is effected with a single O-ring which is best illustrated with reference to FIG. 5. As connected, the end 32 of the helical spring 30 presses against back-up washer 34 and thereby presses the O-ring 24 in sealing engagement against the shoulder 26. The O-ring is also in pressure contact with part of the pipe end portion 12 to effect a seal 64 therewith. The spring bias force must be sufficient to overcome an operating pressure times the annular area defined by the gap 66 between the housing and pipe end portion. It should be noted that the length of the seal effected by the O-ring of the invention is much less than the referenced prior art systems because the O-ring is only required to seal against the shoulder 26 and the outside diameter of the pipe end portion. Also, the O-ring 24 is not activated by operating fluid pressure to effect a seal. The spring biasing means constantly deforms the O-ring into its deflected position to effect a fluid tight seal that is effective over a temperature range from at least about −40° F. to about +250° F.

To illustrate the effectiveness of the coupling of the invention, a 5/16 inch quick connect coupling with one O-ring was subjected to hot and cold testing as illustrated by way of the following two examples.

EXAMPLE I—HOT TEST

Test Requirements: No air leakage at 150 psi (1035 kPa) after vibrating coupling 100 hours, 0.060" (1.5 mm) amplitude, 30 cycles per second at 50 psi (350 kPa), and 250° F. (125° C.). After completion, increase amplitude from 0.060" (1.5 mm) at a rate of 0.019"/hour (0.5 mm/hour). Record amplitude where leakage occurs.

| Test Conditions | Results |
| --- | --- |
| 250° F. at .060" (1.5 mm) | Passed |
| 250° F. at .079" (2.0 mm) | Passed |
| 250° F. at .098" (2.5 mm) | Passed |
| 250° F. at .119" (3.0 mm) | Passed* |

*One sample passed, one sample failed.

EXAMPLE II—COLD TEST

Test Requirements: No air leakage at 150 psi (1035 kPa) after vibrating coupling 100 hours, 0.060" (1.5 mm) amplitude, 30 cycles per second at 10 psi (70 kPa), and −40° F. (−45° C.). After completion, increase amplitude from 0.060" (1.5 mm) at a rate of 0.019"/hour (0.5 mm/hour). Record amplitude where leakage occurs.

| Test Conditions | Results |
| --- | --- |
| −40° F. at .060" (1.5 mm) | Passed |
| −40° F. at .079" (2.0 mm) | Passed |
| −40° F. at .098" (2.5 mm) | Passed |
| −40° F. at .119" (3.0 mm) | Passed* |

*One sample passed, one sample failed.

ADDITIONAL EMBODIMENT OF THE INVENTION

Figure 7:
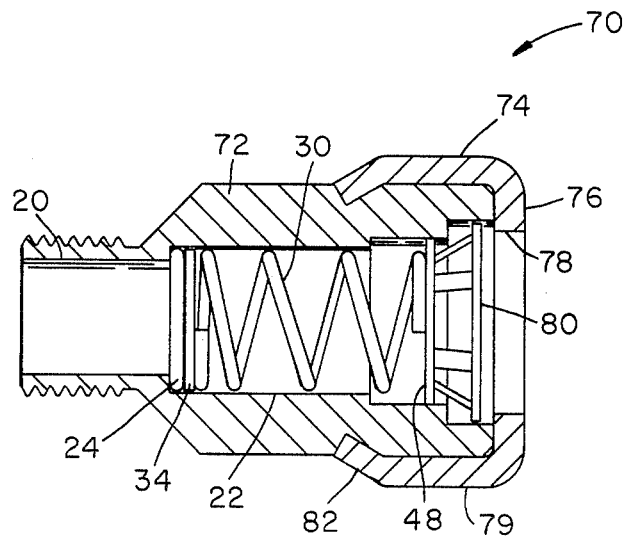
FIG. 7 is a view similar to FIG. 2 but showing another embodiment of the invention.

Another embodiment of the invention is illustrated by FIG. 7. The coupling 70 operates substantially in the same manner as that previously described except that the coupling does not have a removable retaining means which permits the housing 72 of the coupling to be substantially foreshortened. A fastening means comprises a cupped member 74 with a bottom portion 76 having an opening 78 that is aligned with the bores of the housing. A side portion 79 of the cupped member encircles the housing and is staked 82 which retains the cupped member to the housing. The bottom portion secures a retaining ring 80 in the housing, together with the spring 30.

The foregoing description is made for the purpose of illustration only and is not intended to limit the scope of the invention which is to be determined from the claims.

What is claimed is:

1. In a female coupling of the type with a housing having at least two substantially coaxial bores for receiving a male end pipe portion where one of the bores is stepped to a larger diameter than the other bore; at least one O-ring disposed in the housing and with an axis oriented substantially coaxially with the bores, the O-ring defining a sealing means for the housing and a male end pipe portion; and a means for retaining part of a collared pipe end portion in the housing, the collar having a desired radial height and axial thickness; wherein the improvement comprises:
   the housing having the larger diameter bore sized to receive the O-ring without radial clearance and having a generally radially extending annular shoulder between the two bores;
   spring bias means disposed in the housing for biasing the O-ring against a portion of the annular shoulder, deforming the O-ring, and effecting a seal with part of the annular shoulder, the spring bias means having an end portion, juxtaposed the O-ring and an opposite end portion that is axially displaceable an amount at least equal to the desired collar thickness; and
   wherein the retaining means has deflectable fingers juxtaposed the displaceable end portion of the spring bias means, the fingers deflectable an amount at least equal to the desired collar height and the fingers as a means for engaging the collar of a pipe end portion to effect retention.

2. In a female coupling of the type with a housing having at least two substantially coaxial bores for receiving a male end pipe portion where one of the bores is stepped to a larger diameter than the other bore; at least one O-ring disposed in the housing and with an axis oriented substantially coaxially with the bores, the O-ring defining a sealing means for the housing and a male end pipe portion; and a means for retaining part of a collared pipe end portion in the housing, the collar having a desired radial height and thickness; wherein the improvement comprises:

the housing having the larger diameter bore sized to receive the O-ring without radial clearance and having a generally radially extending annular shoulder between the two bores;

means for biasing the O-ring against a portion of the annular shoulder, deforming the O-ring, and effecting a seal with part of the annular shoulder and wherein the biasing means includes a coiled compressing spring located in and oriented substantially coaxially with the larger diameter bore, the spring having the first end portion juxtaposed a side portion of the O-ring that oppositely faces the annular shoulder and an opposite, second end portion that is axially displaceable an amount at least equal to the desired collar thickness; and wherein the retaining means has deflectable fingers juxtaposed the displaceable end portion of the spring bias means, the fingers deflectable an amount at least equal to the desired collar height and the fingers as a means for slipping over and engaging the collar of a pipe end portion to effect retention.

3. In a female coupling of the type with a housing having at least two substantially coaxial bores for receiving a male end pipe portion where one of the bores is stepped to a larger diameter than the other bore; at least one O-ring disposed in the housing and with an axis oriented substantially coaxially with the bores, the O-ring defining a sealing means between the housing and a male end pipe portion; and a means for retaining part of a pipe end portion in the housing; wherein the improvement comprises:

the housing having a generally radially extending annular shoulder between the two bores;

means for biasing the O-ring against a portion of the annular shoulder and effecting a seal with part of the annular shoulder wherein the biasing means includes a coiled compression spring located in and oriented substantially coaxially with the larger diameter bore, the spring having a first end portion juxtaposed a side portion of the O-ring that oppositely faces the annular shoulder; and wherein a portion of the housing at the larger diameter bore is deformed radially inward juxtaposed a second end portion of the spring and defines a means for retaining the spring in the larger diameter bore.

4. The female coupling as claimed in claim 3 and including a first back-up ring located in the larger diameter bore between the O-ring and first end portion of the spring.

5. In a female coupling of the type with a housing having at least two substantially coaxial bores for receiving a male end pipe portion where one of the bores is stepped to a larger diameter than the other bore; at least one O-ring disposed in the housing and with an axis oriented substantially coaxially with the bores, the O-ring defining a sealing means for the housing and a male end pipe portion; and a means for retaining part of a collared pipe end portion in the housing the collar having a desired radial height and axial thickness; wherein the improvement comprises:

the housing having a generally radially extending annular shoulder between the two bores;

means for biasing the O-ring against a portion of the annular shoulder and effecting a seal with part of the annular shoulder wherein the biasing means includes a coiled compression spring located in and oriented substantially coaxially with the larger diameter bore, the spring having a first end portion juxtaposed a side portion of the O-ring that oppositely faces the annular shoulder and an opposite, second end portion that is axially displaceable an amount at least equal to the desired collar thickness;

a first back-up ring located in the larger diameter bore between the O-ring and first end portion of the spring;

a second O-ring located in the housing between the first back-up ring and first end portion of the spring; and wherein the retaining means has defectable fingers juxtaposed the displaceable end portion of the spring bias means, the fingers deflectable an amount at least equal to the desired collar height and the fingers as a means for slipping over and engaging the collar of a pipe end portion to effect retention.

6. The female coupling as claimed in claim 5 and including a second back-up ring located in the larger diameter bore between the second O-ring and first end portion of the spring.

7. The female coupling as claimed in claim 5 wherein the retaining means comprises a retaining ring located in the housing and oriented substantially coaxially with the bores and positioned juxtaposed a second end portion of the spring, the retaining ring having a plurality of deflectable fingers extending inwardly into at least part of the larger diameter bore as a means for engaging part of a pipe end portion to effect retention.

8. The female coupling as claimed in claim 7 wherein the retaining ring is split.

9. The female coupling as claimed in claim 7 and including a fastening means for securing the retaining ring in the housing.

10. The female coupling as claimed in claim 9 wherein the fastening means comprises a removable threaded fastener attached to a threaded portion of the housing juxtaposed the retaining ring, the threaded fastener having a bore oriented substantially coaxially with the bores of the housing.

11. The female coupling as claimed in claim 10 wherein the fastening means includes a flexible polymeric washer oriented coaxially with the bore of the fastening means, the polymeric washer having a plurality of radially inwardly extending deflectable fingers as a means for inhibiting entry of foreign material into the housing.

12. The female coupling as claimed in claim 9 wherein the fastening means comprises a cupped member with a bottom portion having an opening aligned with the bores and a side portion encircling and staked to the housing.

13. In a female coupling of the type with a housing having at least two substantially coaxial bores for receiving a male end pipe portion where one of the bores is stepped to a larger diameter than the other bore; at least one O-ring disposed in the housing and with an axis oriented substantially coaxially with the bores, the O-ring defining a sealing means for the housing and a male end pipe portion; and a means for retaining part of a collared pipe end portion in the housing, the collar having a desired radial height and axial thickness; wherein the improvement comprises:

the housing having a generally radially extending annular shoulder between the two bores;

means for biasing the O-ring against a portion of the annular shoulder and effecting a seal with part of the annular shoulder, the biasing means including a first back-up ring abutting a side portion of the O-ring and a coiled compression spring located in and oriented substantially coaxially with the larger diameter bore, the spring having a first end portion in pressing engagement against the back-up ring and an opposite end portion that is axially displaceable an amount at least equal to the desired collar thickness;

said retaining means comprising a retaining ring located in the housing and oriented substantially coaxially with the bores and positioned juxtaposed a second end portion of the spring, the retaining ring having a plurality of deflectable fingers extending inwardly into at least part of the larger diameter bore, the fingers deflectable an amount at least equal to the desired collar height and as a means for sliding over and engaging part of the collar of a pipe end portion to effect retention; and a means for securing the retaining ring in the housing.

14. The female coupling as claimed in claim 13 and including:

a second O-ring located in the housing with an axis oriented substantially coaxially with the bores and a first side portion abutting the first backup ring and a second side portion facing toward the biasing means; and a second back-up ring abutting the second side portion and interpositioned between the second O-ring and first end portion of the coiled compression spring.

* * * * *